(No Model.)
C. R. LEE.
DEVICE FOR GRADING BROOM CORN STEMS.
No. 492,032. Patented Feb. 21, 1893.
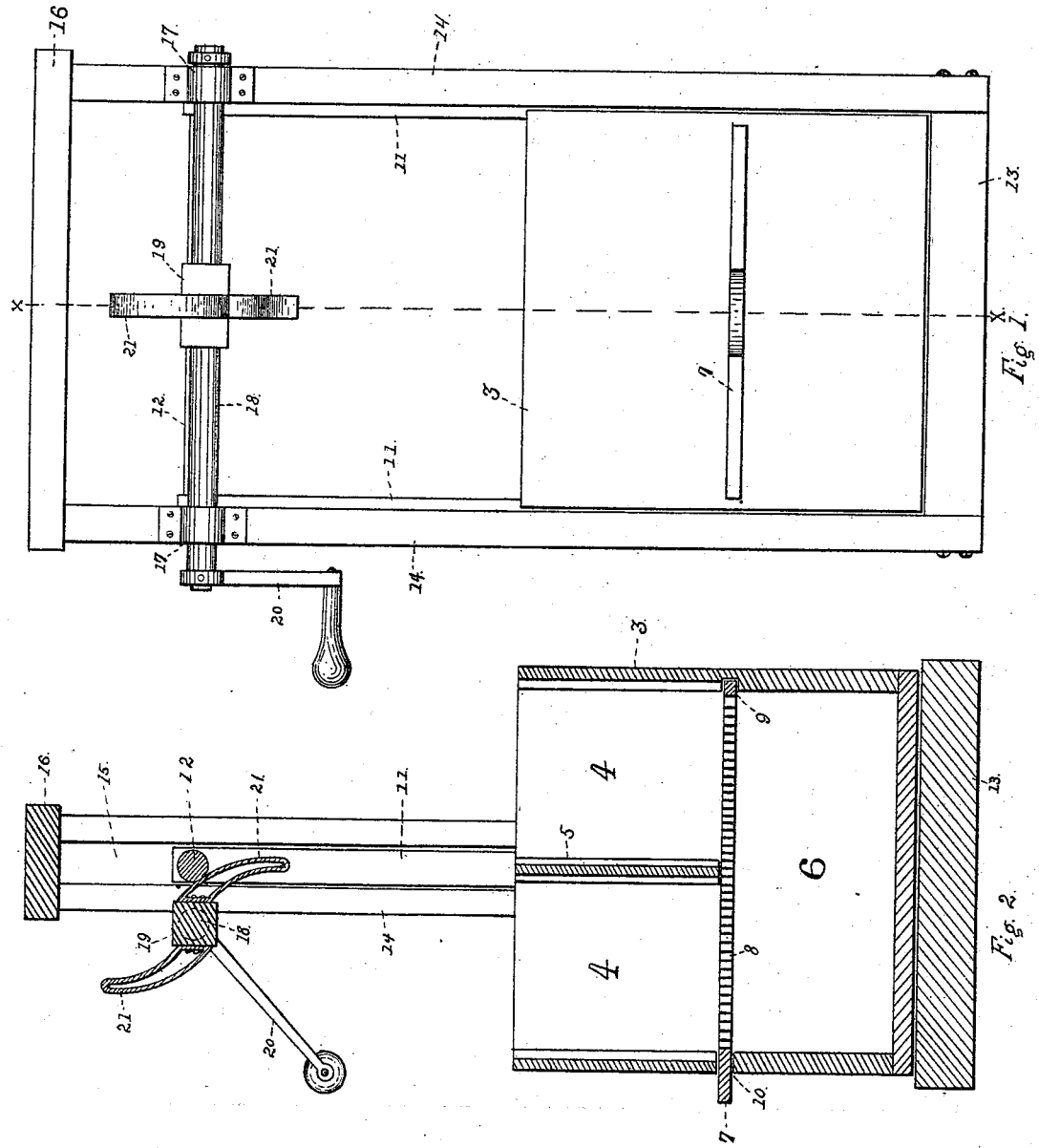

UNITED STATES PATENT OFFICE.

CLINTON R. LEE, OF DAVENPORT, IOWA.

DEVICE FOR GRADING BROOM-CORN STEMS.

SPECIFICATION forming part of Letters Patent No. 492,032, dated February 21, 1893.

Application filed March 17, 1892. Serial No. 425,278. (No model.)

*To all whom it may concern:*

Be it known that I, CLINTON R. LEE, a citizen of the United States, residing at Davenport, in the county of Scott and State of Iowa, have invented a new and useful Improvement in Devices for Grading Broom-Corn Stems, of which the following is a specification.

My invention relates to improvements in devices for grading broom corn stems, in which the ends of the finer stems are passed through the interstices of a sieve, while the ends of the coarser stems rest upon the sieve, and the object of my invention is to grade the stems so as to permit separation of the finer stems from the coarser stems by the operation in an expeditious manner. I accomplish this object by the mechanism illustrated in the accompanying drawings in which:

Figure 1 is a front view of the entire device and Fig. 2 is a vertical sectional view of the same on the line X—X of Fig. 1.

Similar numerals of reference refer to similar parts throughout the several views.

3 represents a rectangular box or vessel, the upper half divided into compartments 4, of any desired number by partitions 5, and the lower half being in one compartment, 6. The rectangular frame 7, is provided with a sieve 8, arranged to slide in the box 3, in the grooves 9 and slot 10. The sides of the rectangular box are provided with two exterior vertical guide bars 11—11, extending above the box and connected at the top by a cylindrical cross piece 12.

I construct a frame, consisting of a base 13, provided with two vertical posts 14—14, which posts are each upon their inner sides vertically slotted as at 15, to receive a guide bar 11, and said posts 14 are connected at the top by a cross bar 16. The two journal boxes 17—17, are each secured to an edge of the posts 14 in line to receive the ends of the rotating shaft 18, the middle portion of which shaft I prefer to make rectangular or square in form as at 19 and at one end of the shaft outside of the frame, I attach a crank handle 20. At about the center of the shaft upon opposite sides I attach two curved arms, 21—21.

I will now describe the operation of my device. Broom corn intended for use in the manufacture of brooms, is cut off from the main stalk and the bunches of broom corn stems are usually about the same length, but the size of the stems will vary; the finer stems being used for the outside of the broom while the coarser stems are used in the interior of the broom.

In my device, a desired number of the broom stems are placed, butt end down, in the compartments 4 of the rectangular box, and by means of the crank handle, the shaft 18 is revolved so that a curved arm 21, is brought in contact with the underside of the cylindrical cross-piece 12, such arm raising the cross piece, and thus raising or elevating the box, 3, its guide bars moving or sliding in the slots of the vertical posts, until the end of the arm passes underneath such cross-piece and becomes disengaged therefrom, when the box by its weight, drops or falls, its bottom coming in contact with the base 13 of the frame, and the jar thus occasioned causes the finer stems which will pass through the perforations in the sieve, to descend through the same, so that their butt ends will be within the lower compartment 6 of the box, but the coarser stems which will not pass through the perforations in the sieve will retain their position, their butt ends resting on the sieve. The operation of raising and dropping the box is continued until all the finer stems have entered through the perforations in the sieve, and as a consequence, the upper ends of the finer stems will be lower than the upper ends of the coarser stems; the operator then grasps with one hand the upper ends of the coarser stems and with his other hand, grasps the bunch of stems lower down, and with the former hand draws out the coarser stems from the bunch, thus separating the same from the finer stems.

The essential part of my invention consists in the box with its upper compartments and lower compartment separated by the sieve, with means for elevating the box and dropping the same, and it will be understood that the operator could fill the compartments with stems and then by his hands elevate the box to the desired height and then drop it so that its bottom would strike the floor, and thus produce the same result as produced by the frame and other parts which I have described. I prefer however, to construct the frame and other parts which I have described, yet it will be readily understood by persons skilled in the art, that many changes and modifications may be made in the frame and other parts and in the box, without departing from the scope of my invention. It will also be understood that sieves with different sized apertures may be used as desired.

What I claim as new, and desire to secure by Letters Patent, is—

1. In a device for grading broom-corn stems, the combination of a vessel, the upper portion divided into compartments, such upper and lower compartments separated by a suitable sieve, such device adapted to be elevated to a desired height and then dropped, so that the under portion of the vessel by such fall is brought in contact with a fixed body for the purposes stated and substantially as described.

2. In a device for grading broom-corn stems, the combination of a vessel, the upper portion divided into compartments, the lower portion arranged in compartments, such upper and lower compartments separated by a suitable sieve, the vertical guide bars attached to said vessel, the cylindrical cross-piece connecting such guide bars, the frame consisting of the base, the slotted vertical posts attached thereto, the cross bar connecting such slotted posts, the shaft journaled to said posts, the curved arms attached to said shaft and the crank handle attached to an end of such shaft, substantially as described.

CLINTON R. LEE.

Witnesses:
T. A. MURPHY,
L. G. SUSEMIHL.